US012639440B2

(12) United States Patent
Gifre et al.

(10) Patent No.: US 12,639,440 B2
(45) Date of Patent: May 26, 2026

(54) CHANGE AND RECOVERY OF PERSONALIZATION DATA IN A SECURE ELEMENT

(71) Applicant: Giesecke+Devrient Mobile Security Germany GmbH, Munich (DE)

(72) Inventors: Clara Gifre, El Prat de Llobregat (ES); David Patino, El Prat de Llobregat (ES); Xavier Gomez, El Prat de Llobregat (ES); Patricia Naranjo Gallardo, El Prat de Llobregat (ES)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 67 days.

(21) Appl. No.: 18/411,563

(22) Filed: Jan. 12, 2024

(65) Prior Publication Data
US 2024/0241959 A1    Jul. 18, 2024

(30) Foreign Application Priority Data
Jan. 12, 2023    (EP) .................................... 23382020

(51) Int. Cl.
G06F 21/57          (2013.01)
G06F 21/78          (2013.01)

(52) U.S. Cl.
CPC .............. G06F 21/57 (2013.01); G06F 21/78 (2013.01)

(58) Field of Classification Search
CPC . G06F 21/57; G06F 21/78; G06F 8/65; G06F 21/79; G06F 21/33; G06F 21/577
See application file for complete search history.

(56) References Cited

U.S. PATENT DOCUMENTS 11,720,337 B2 * 8/2023 Aabye ...................... G06F 8/71
                                              717/170
2003/0131083 A1 * 7/2003 Inui .......................... G06F 8/65
                                              709/221
2008/0109661 A1 * 5/2008 Sotoodeh ................ G06F 21/34
                                              713/191

(Continued)

FOREIGN PATENT DOCUMENTS

EP        2861003 A1 *  4/2015  .............. H04W 4/60
EP        2887213 A1     6/2015
(Continued)

OTHER PUBLICATIONS

Extended European Search Report from corresponding EP Application No. 23382020.8, Jun. 30, 2023.

*Primary Examiner* — John B King
(74) *Attorney, Agent, or Firm* — Workman Nydegger

(57)          ABSTRACT

A method is provided for changing and recovering personalization data of a trusted software in a secure element and changing and restoring diversified data. The method includes the steps of providing an update agent in the secure element; storing personalization data in the installed software; performing a Full Reflash to recover or update a software or operating system comprising the steps of first securing personalization data to a memory of the update agent before, in following step, recovering or loading a software image into the secure element. The method includes as a final step personalizing the software image by the personalization data secured during the first step of the Full Reflash.

10 Claims, 4 Drawing Sheets

(56)                    References Cited

U.S. PATENT DOCUMENTS

| | | | |
|---|---|---|---|
| 2015/0193224 A1 | 7/2015 | Ziat et al. | |
| 2015/0312041 A1 * | 10/2015 | Choi ................... | H04L 63/0861 |
| | | | 713/175 |
| 2018/0039795 A1 * | 2/2018 | Gulati ................. | H04L 63/0823 |
| 2019/0020641 A1 * | 1/2019 | Wasily .................... | G06F 21/44 |
| 2019/0238555 A1 * | 8/2019 | Buffard .............. | H04L 63/0823 |
| 2024/0346147 A1 * | 10/2024 | Patino ................... | G06F 21/572 |

FOREIGN PATENT DOCUMENTS

| | | | | |
|---|---|---|---|---|
| EP | 4124976 A1 * | 2/2023 | ........... | G06F 9/4451 |
| EP | 4124979 A1 * | 2/2023 | ......... | G06F 21/6245 |
| WO | 2016058006 A1 | 4/2016 | | |

\* cited by examiner

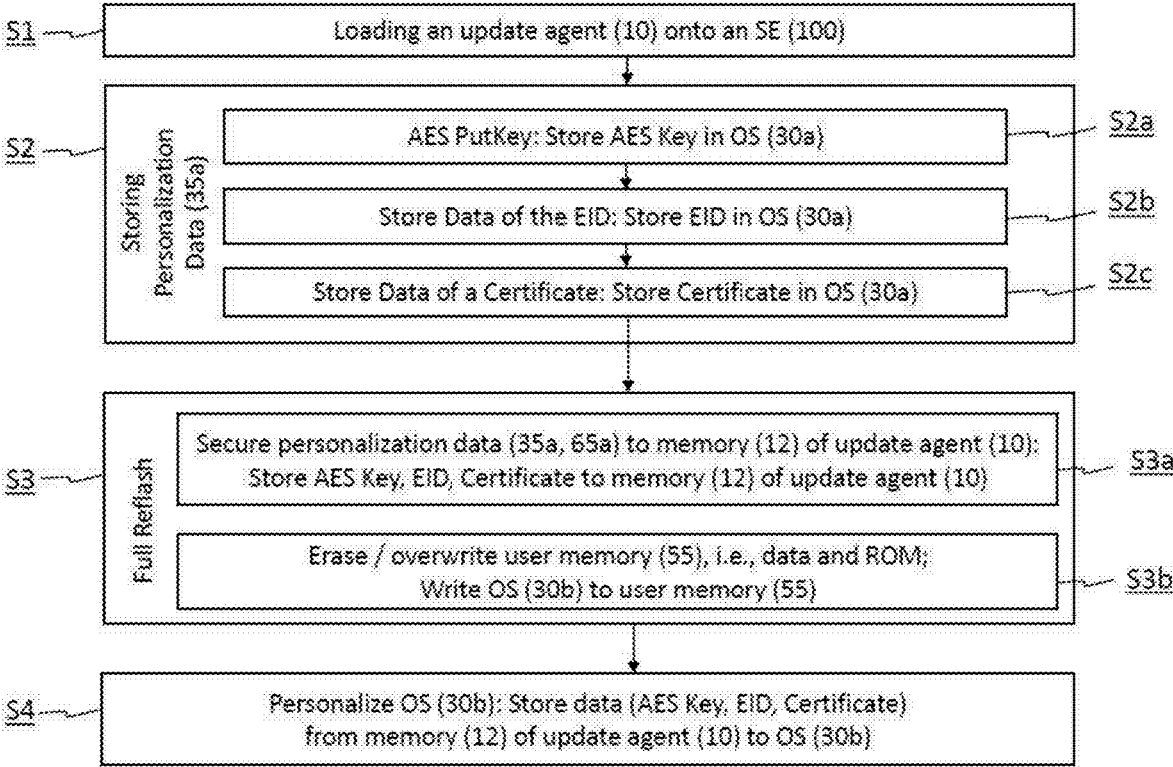

S1 — Loading an update agent (10) onto an SE (100)

S2 — Storing Personalization Data (35a)

S2a — AES PutKey: Store AES Key in OS (30a)

S2b — Store Data of the EID: Store EID in OS (30a)

S2c — Store Data of a Certificate: Store Certificate in OS (30a)

S3 — Full Reflash

S3a — Secure personalization data (35a, 65a) to memory (12) of update agent (10): Store AES Key, EID, Certificate to memory (12) of update agent (10)

S3b — Erase / overwrite user memory (55), i.e., data and ROM; Write OS (30b) to user memory (55)

S4 — Personalize OS (30b): Store data (AES Key, EID, Certificate) from memory (12) of update agent (10) to OS (30b)

Fig. 3

CHANGE AND RECOVERY OF PERSONALIZATION DATA IN A SECURE ELEMENT

The present invention relates to changing and recovering personalization data of trusted software in a secure element and, in particular, to changing and recovering diversified data, for instance of the operating system of the secure element.

BACKGROUND OF THE INVENTION

Secure elements are widely used in a variety of systems, such as mobile phones, smart cards, payment cards and access cards, to provide identification, authentication, data storage and application processing. Where, for example, the smart card contains security-critical applications and sensitive data, such as in the case of payment cards and the like, a secure element is used to store the data.

A secure element is a tamper resistant element, TRE, that provides a secure memory and an execution environment in which application code and application data can be securely stored and administered. The secure element ensures that access to the data stored on the card is provided only when authorized. Such a secure element may exist in any form factor such as UICC, embedded SE, smartSD, smart microSD, eSIM, etc.

A secure element includes an operating system, applications, and personalization data, the latter including keys and/or certificates required to operate the operating system and applications. The operating system, applications and personalization data are stored within the secure element in volatile and non-volatile memory modules and are executed in a secured processor of the secure element.

The specification Global Platform Card Technology Open Firmware Loader for Tamper Resistant Elements v1.3 describes standardized mechanisms for loading firmware (that is, use case dependent data which may contain the operating system and application data) and personalization data into a secure element. In particular, an update agent, e.g., an Image Trusted Loader, ITL, provided inside the secure element is configured to receive an operation system image, and—using personalization data—to perform security checks on the image, to trigger installation of the image contents into a memory of the secure element, and to operate the image, so as to install in the secure element an operable operating system.

FIG. 1 shows a schematic representation of a process of loading firmware (e.g., an operating system, OS) including an update agent into a secure element during production phase. The upper row shows the entities responsible for the corresponding phases (I, II, III, IV), while the lower row shows the content of the secure element (i.e., chip) in that phase. During a first production phase I at a chip production site (i.e., the chip factory), the chip manufacturer provides for a secure element 100 to be loaded with trusted software, such as a secure operating system or an update agent. Furthermore, the trusted software is personalized with personalization data 35a (secure credentials), which, upon personalization, are stored in a personalized software image, e.g., a personalized operating system image, referred to as "maxiInit" in FIG. 1. The trusted software or OS is personalized by specific commands, so called APDUs, that are sent from an external personalization device at the chip production site to the secure element. The personalized software is finally loaded inside the chip.

The chip with its personalized software is then, at a device manufacturer's site, embedded in a portable card-like device, such as an (e)UICC or (e)SIM (phase II), or can be delivered to another device manufacturer's site to be included in an electronic end device like a smart phone, a computer, a car, a measurement equipment, etc. (phase III), and finally released to the market (phase IV).

By following the process set out above, the personalization data and the personalized software image are loaded in the chip at the chip factory (phase I), because for security reasons personalization data, such as keys and certificates, must be loaded in the certified environment during chip production. Consequently, when performing an update agent "Full Reflash", all personalization data 35a is deleted and cannot be restored, at least not to the extent that it is not saved in a personalized software image, particularly the so called MaxiInit, or in a separate, specifically protected memory of the secure element.

To be able to restore personalization data that is not stored in a software/OS image after a Full Reflash, personalization data is secured in a data memory region of the update agent during the production process (phase I). The problem, however, is that personalization data secured in this way cannot be changed after chip production (phase I). In particular, there is no way to change and recover personalization data secured in this way, e.g., after a security breach.

Accordingly, there is a need for a changing and recovering personalization data that overcomes the above-mentioned drawbacks.

SUMMARY OF THE INVENTION

The present invention addresses the above object by the subject-matter covered by the independent claims. Preferred embodiments of the invention are defined in the dependent claims. The preferred embodiments contribute to a further improvement of the solution proposed by the present invention.

According to a first aspect of the present invention, there is provided a method for changing and recovering personalization data of an installed software during a Full Reflash, in particular personalization data of an operating system, in a secure element. The method comprises in a first step providing an update agent in the secure element. In a second step, personalization data is stored in the installed software. That is, the personalization data is integrated within the installed software in the secure element so that the personalization data forms one integral unit with the installed software. The Full Reflash comprises two steps, first securing the personalization data from the installed software to a memory of the update agent and, thereafter, in a second step of the Full Reflash, loading a software image into the secure element. Here, the software image preferably represents an updated version of the installed software. In a final step, after the Full Reflash has been performed, the software image is personalized using the personalization data secured in the memory of the update agent.

Within the context of the present invention the expression "personalization data" designates data that is used to personalize software in a secure element and, for security reasons, is (conventionally) loaded within a certified environment. Personalization data is different for each secure element and comprises secure credentials, including keys and certificates. Personalization data is required for application management, operating installed software, performing security checks, particularly authentication and integrity checks, for a software image, and installing a software image on a secure element so that it can be executed.

Throughout this application the term "software" refers to any trusted software to be loaded and executed in the secure element. Examples of such software include firmware, an operating system (OS), and any other use-case dependent secure applications. The expression "software image" (or "OS image") refers to a generic data format encapsulating a software version and cryptographic data to be used by the operating system or an agent of the SE, such as the update agent according to the present invention.

An update agent "Full Reflash" refers to a process where either before or intrinsically during a software image upload all installed software, in particular the installed operating system, together with all personalization data is completely deleted from the user memory area of a chip. This deletion is required upon software update because ROM updates are not possible.

During a Full Reflash all software and personalization data in the user memory area are deleted/overwritten. Therefore, it is conventionally not possible to update installed software of a secure element outside a certified environment, since the personalization data to personalize and make a software image operable are not available outside the certified environment. This can in principle be overcome by securing personalization data in the memory of the update agent in the certified environment during production phase I of the secure element. After a Full Reflash has been performed, personalization data can then be restored from the memory of the update agent and be used to personalize the software image.

However, the installed software may have been further personalized after production phase I. For example, a Service Provider-Trusted Service Manager, SP-TSM, may have further personalized the software with personalization data to customize the secure element or to resolve a security breach. In this case, restoring the personalization data using personalization data secured in the memory of the update agent during production phase I is either not possible or would only restore an outdated version of the personalization data.

A key feature of the present invention is therefore that personalization data is secured from an installed software to the memory of the update agent at the beginning of a Full Reflash to be reused to personalize a recovered/updated software image after the Full Reflash has been completed. This way, the present invention provides a secure and efficient way to change personalization data and protect it from being deleted and/or overwritten by obsolete personalization data during a Full Reflash.

Moreover, since writing to the memory of the update agent can be done only on an entire page basis, the present invention helps to save space in the memory of the update agent. According to the present invention the personalization data is saved in one single operation at the beginning of the Full Reflash. In contrast, this is conventionally done during the production phase I through separate write operations each time a personalization data is changed.

In some embodiments of the present invention, the personalization data stored, secured and used to personalize the loaded software image comprises diversified data.

Within the context of the present invention the expression "diversified data" refers to a subset of personalization data that is stored in an installed software/OS but not stored in a personalized software/OS image (MaxiInit) That is, diversified data is integrated within the installed software/OS in the secure element the personalization data but not, however, integrated within the personalized software/OS image (MaxiInit) Diversified data may include, inter alia, Advanced Encryption Standard (AES) keys, EID numbers, and/or certificates.

The present invention is particularly relevant for diversified data because such data is not stored in a respective software image, particularly not in the MaxiInit, when the installed software is the operating system.

In some embodiments of the present invention, the personalization data is stored in the installed software, that is, again, the personalized data is integrated within the installed software in the security element so that the personalized data forms an integral unit with the installed software and/or the personalized data is secured by the update agent in a phase (II, III, IV) after the production phase I of the secure element.

The present invention is particularly relevant when the installed software is further personalized after the production phase of the secure element, for instance to customize a secure element or to resolve a security breach, and/or when a Full Reflash is performed after the production phase to update or recover an installed software.

In some embodiments of the present invention, the personalization data is stored together with the installed software in a memory area of the secure element, in particular a memory area, where installed and/or executable software is stored, such as a non-volatile memory of the secure element.

In some embodiments of the present invention, the personalization data is secured by reusing and/or copying the personalization data from the memory area of the secure element to a memory of the update agent. Preferably, the personalization data is stored in a specific memory or memory structure of the update agent, such as a dedicated and secured segment of the non-volatile memory, to which the update agent has exclusive access to.

In some embodiments of the present invention, the installed software is deleted together with the personalization data by deleting the memory area of the secure element prior to loading the software image or because of loading the software image into the memory area. In particular, in cases where the installed software is the operating system of the secure element, cancelling the complete operating system includes cancelling all personalization data, including certificates, cryptographic keys, secure credentials and the like.

In some embodiments of the present invention, the update agent is provided by loading the update agent into the secure element during a production phase of the secure element.

According to a second aspect of the present invention, there is provided a secure element comprising an installed software, in particular an operating system, and an update agent comprising a memory. Here, the installed software is configured for storing personalization data required for operating the installed software. The update agent is configured for performing a Full Reflash comprising two steps, first securing the personalization data from the installed software to a memory of the update agent, and, thereafter, loading a software image into the secure element. Here, the software image preferably represents an updated version of the installed software. In a step following the completion of the Full Reflash, the update agent is further configured to personalize the software image using the personalization data secured at the beginning of the Full Reflash.

In some embodiments of the present invention, the secure element is configured to store in the installed software, to secure in the memory of the update agent, and to personalize the software image by personalization data that comprises diversified data, preferably an AES Key, an EID, and/or a certificate.

In some embodiments of the present invention, the secure element is configured to store the personalization data together with the installed software in a memory area of the SE, and to secure the personalization data by reusing and/or copying the personalization data from the memory area of the SE to a memory of the update agent.

According to a third aspect of the present invention, there is provided an update agent for use in a secure element. The update agent comprises a memory and is configured for performing a Full Reflash comprising two steps, first securing the personalization data from the installed software to a memory of the update agent, and, thereafter, loading a software image into the secure element. Here, the software image preferably represents an updated version of the installed software. The update agent is further configured to personalize the software image in a step following the completion of the Full Reflash using the personalization data secured at the beginning of the Full Reflash.

In some embodiments of the present invention, the update agent is configured to secure in the memory of the update agent, and to personalize the software image by personalization data that comprises diversified data, preferably an AES Key, an EID, and/or a certificate.

In some embodiments of the present invention, the update agent is configured for performing a Full Reflash and for personalizing the software image by the secured personalization data in a phase (II, III, IV) after the production phase I.

In some embodiments of the present invention, the update agent is configured to conduct a method according to the first aspect of the invention and/or is realized as an executable software product configured to be installed on a security element according to the second aspect of the present invention and to be executed by a processor of the security element.

According to yet a further aspect of the present invention, there is provided a computer-program for use in conjunction with a secure element according to the second aspect of the invention in an electronic device in which the secure element is or can be embedded. The computer-program product comprises a non-transitory computer-readable storage medium and a computer-program mechanism embedded therein. The computer-program mechanism comprises instructions for performing a Full Reflash comprising instructions for securing personalization data from the installed software to the memory of the update agent and instructions for loading a software image into the secure element, wherein the software image preferably represents an updated version of the installed software. Furthermore, the computer-program mechanism comprises instructions for personalizing the software image by the secured personalization data.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which

FIG. 3 shows a flow diagram illustrating a method according to the present invention.

DETAILED DESCRIPTION

Figure 1:
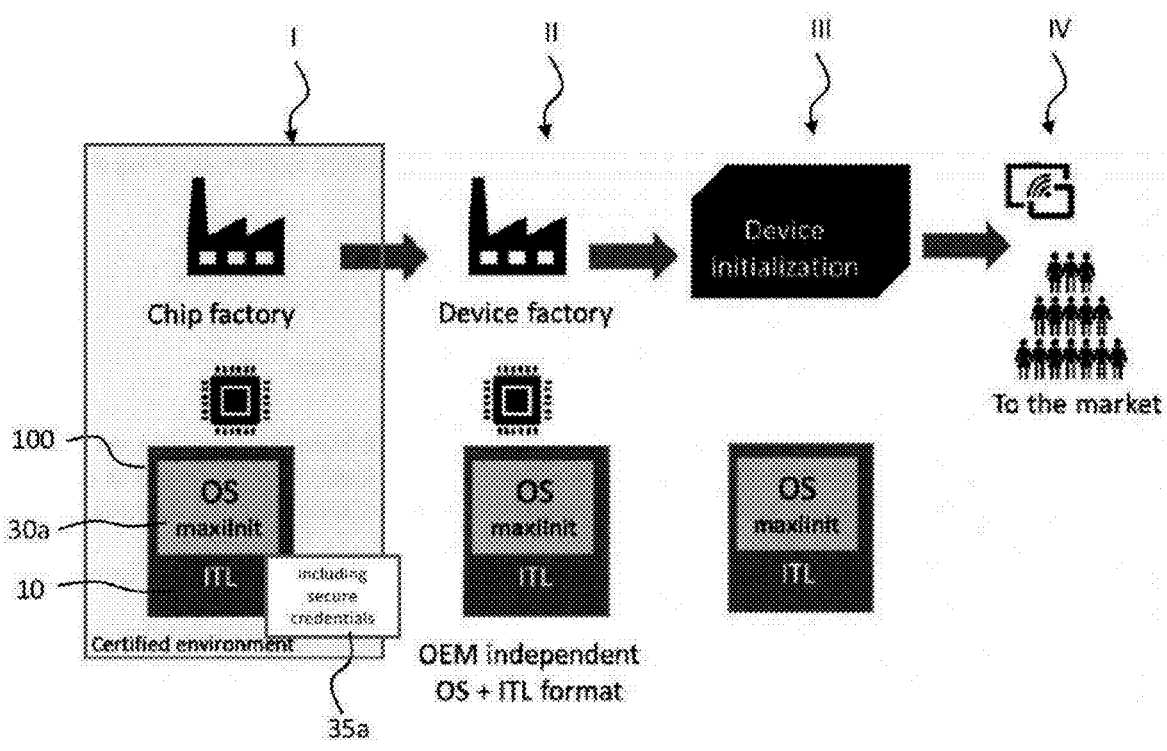
FIG. 1 shows a schematic representation of a production flow of a secure element.

Detailed explanations of the present invention are given below with reference to the attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2A:
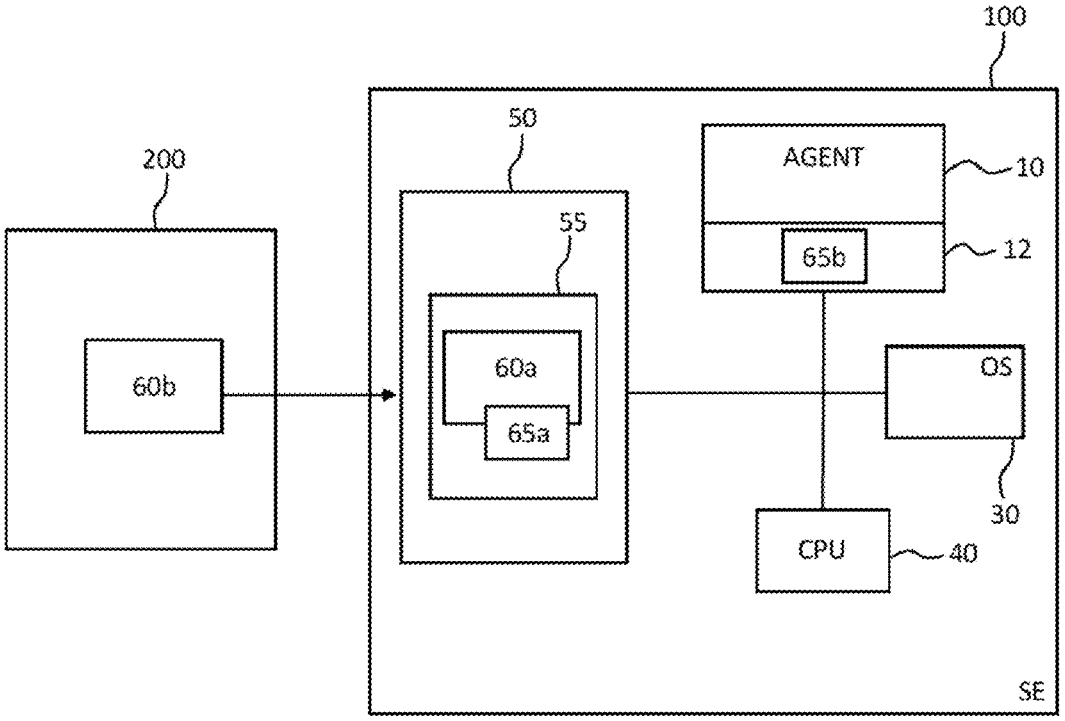
FIG. 2a shows the structure of a secure element according to a first preferred embodiment of the present invention.
Figure 2B:
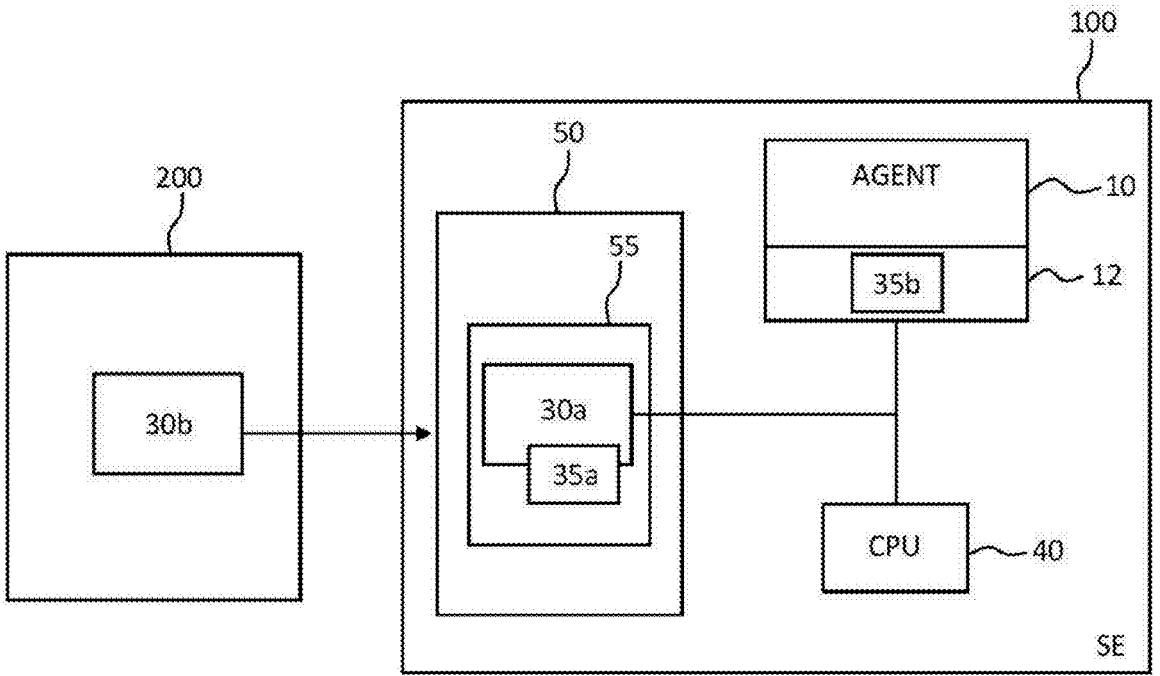
FIG. 2b shows the structure of a secure element according to a second preferred embodiment of the present invention.

FIGS. 2a and 2b show the structure of the secure element, SE, 100 according to two preferred embodiments in greater detail. FIG. 3 shows the steps of the method according to the invention in connection to FIGS. 2a and 2b.

The SE 100 shown in FIG. 2a is a tamper resistant element, TRE, containing an update agent 10, an operating system, OS, 30, and a processor, CPU, 40. Both the update agent 10 and the OS 30 may be stored in a memory of the SE 100, such as the non-volatile memory 50. The OS 30 and the update agent 10 are independent entities that can communicate with each other over an appropriate interface, for instance over an Application Programming Interface, API. Memory 50 is a non-volatile memory of the SE 100 that comprises a memory area 55 in which software is stored, which is installed on the SE 100 and executable by the CPU 40. Such installed software may be an executable application or program, identified by reference numeral 60a in FIG. 2a, that provides a certain functionality to the secure element, or may even be the operating system of the secure element 100, identified by reference numeral 30a in FIG. 2b, which, in the present context also is an installed software. Both the OS 30a of FIG. 2b and the OS 30 of FIG. 2a are standard operating systems of secure elements or smart cards, for example based on the Java Card platform. They are equivalent and the difference between FIGS. 2a and 2b is that the OS 30 of FIG. 2a is in FIG. 2b subject to a change of personalization data, for instance diversified data, in a phase II, III, IV after production phase I, and then to a Full Reflash, e.g., due to an operating system 30 update and/or recovery.

The update agent 10 may be a functional part of or realized as a functionality of the operating system 30 or a loader entity allowing the provisioning of software (such as, for instance, use case dependent firmware) within the SE 100. Such loader entities are also referred to as Image Trusted Loader, ITL, in the art. Update agents are the main entities in charge of loading software or software images into the secure element as well as any other procedure related to it, such as update, restore, rollback or the like. In FIGS. 2a and 2b software images to be loaded onto the SE 100 are referred to by reference numerals 60b, identifying an arbitrary software image, and 30b, identifying an operating system image, respectively. The update agent 10, regardless of whether it is realized as an independent entity or as functional part of the operating system 30, is also loaded onto the SE 100 during factory production (see phase I of FIG. 1), because it reflects a security critical entity of the SE 100.

The update agent 10 may contain its own reserved memory space in form of a memory structure 12, to store sensible data thereon, for instance personalization data and/or authentication data, the latter being used to authenticate and/or decrypt a software image 30b, 60b before it is personalized. At some point of the personalization process, the memory structure 12 of the update agent 10 may therefore contain personalization data 35b, 65b and the operating system 30 may have access to at least part of the memory structure 12.

According to FIG. 2a, an executable software 60a is installed on the SE 100 in a personalized way. The installed software 60a therefore has personalization data 65a associated therewith, including for instance diversified data, such as AES keys, EID, certificates and/or specific data including credentials and/or crypto-graphic keys, that allow for (joint) application management by a SEI-TSM and/or by a SP-TSM, and which ensure that the installed software is an authenticated, trusted, and untampered software.

The installed software 60a and the personalization data 65a are stored together in the memory area 55 of the SE 100. Within the memory area 55, the installed software 60a and the respective personalization data 65a may be stored in an intertwined fashion to form an integral unit in the memory area 55 of the SE 100, because upon installation the software 60a is equipped or enriched with personalization data 65a in various ways. The software 60a may have been personalized and installed on the SE 100 during factory production of the SE 100 (phase I of FIG. 1), because personalization is a security-critical operation that conventionally is performed within a certified environment of a production site of the manufacturer of the SE 100. FIG. 2b differs over FIG. 2a in that it relates to the case where the installed software is in fact the operating system 30a of the SE 100 itself, having attached therewith individual personalization data 35a. For the reasons outlined above, the operating system 30a is personalized and installed on the SE 100 during factory production of the SE 100 (see phase I of FIG. 1).

However, the installed software 60a/OS 30a may also have been (further) personalized after production phase I. For example, an SP-TSM may have personalized the software with personalization data/diversified data to further customize the SE 100 or to resolve a security breach, or an SP-TSM may have personalized a newly installed applet.

To be able to update and/or recover the installed software 60a, 30a in a phase II, III, IV after the production phase I, personalization data 65a, 35a may be secured to the memory 12 of the update agent 10. Securing personalization data conventionally occurs within a certified environment during production phase I, where the personalized data 65a, 35a is secured each time the personalization data 65a, 35a is changed during the production phase I.

When the secure element 100 proceeds to a phase II, III, IV after the production phase I (see FIG. 1), secured data 35b, 65b is conventionally preserved in the state it is when the SE 100 leaves production phase I. Therefore, the update agent 10 stops securing personalization data 65a, 35a at the end of the production phase I. However, this poses the problem that subsequent changes to the personalization data 65a, 35a, especially diversified data, cannot be recovered, e.g., after an update or a recovery that requires a Full Reflash.

FIG. 3 shows the main steps of a method for changing and recovering personalization data 35a, 65a after a Full Reflash according to one embodiment of the invention. The steps of the method are described in detail with reference to the secure element 100 illustrated in FIG. 2a and FIG. 2b, and for convenience with reference to diversified data 35a of an installed operating system 30a.

The method according to the present invention, as described in the following, is not restricted to diversified data of any software or software image. In fact, any personalization data that can be stored in a secure software installed on and executed by a secure element 100 can be subject to the method for changing and restoring personalization data as disclosed herein, for example personalization data stored in a firmware or OS of the SE 100 or in an applet/application.

With reference to FIG. 3, in a first step 51 performed within a certified environment during the initial chip production phase I, the update agent 10 is loaded onto the SE 100. The update agent 10 reflects a security critical entity of the SE 100 that is loaded onto the SE 100 during factory production.

In a second step S2 (comprising steps S2a to S2c), the OS 30a is personalized with diversified data 35a, for instance including an AES Key, EID, and certificate. The second step S2 may occur within a certified environment during production phase I. The second step S2 may also occur in a subsequent phase II, III, IV after production phase, for example when an SP-TSM personalizes the OS 30a with diversified data 35a to further customize the OS 30a/SE 100 or to resolve a security breach. In step S2, the diversified data 35a is stored in the memory area 55 along with the operating system 35a. In one embodiment, this diversified data 35a or a subset thereof may also be secured to the memory 12 of the update agent 10. In one embodiment, a record defining a subset of the diversified data 35a may further be created.

Third and fourth steps S3, S4 illustrate the actual recovery/update of an operating system 30a requiring a Full Reflash in a phase II, or III, or IV after the production phase I (see FIG. 1).

In the first step S3a of the Full Reflash, the diversified data 35a is secured to the memory 12 of the update agent 10. In one embodiment, only a predefined subset of the diversified data 35a may be secured, e.g., corresponding to the subset defined by the record created in the previous step S2. Only in a following step S3b is the operating system image, i.e., MaxiInit, 30b recovered or loaded from an external image server 200 into the memory area 55 of the SE 100. Either before loading the image or intrinsically while loading the image the diversified data 35a is completely deleted from the memory area 55 together with the installed operating system 30*a*. Therefore, once the operating system image 30*b* is loaded into the memory area 55 of the SE 100, the diversified data 35*a* is no longer available. At this point the secure element 100 would conventionally be rendered use-less or outdated, because any operating system image 30*b* would need to be personalized using the latest version of the diversified data. This conventionally is either not possible outside the certified environment of production phase I or would need to be done using diversified data secured during production phase I.

In final step S4, the update agent 10 therefore personalizes the loaded operating system image 30*b* using the diversified data 35*b* secured in the memory 12 during the first step S3*a* of the Full Reflash. The diversified data 35*b* represents a duplicate of the diversified data 35*a* that has been secured just before the deletion of the memory 55 in the second step S3*b* of the Full Reflash. Therefore, when the operating system image 30*b* is personalized in the step S4 after the Full Reflash is completed, the update agent 10 recovers the latest/currently valid diversified data 35*b*, even if the diversified data 35*a* was changed in a phase II, III, IV after the production phase I. By restoring the diversified data, the operating system image 30*b* can be rendered operable using the latest/currently valid diversified data 35*b*, regardless of the phase in which the last change to the diversified data 35*a* occurred.

Furthermore, since the communication of the operating system 30*a* with the memory 12 of the update agent 12, e.g., Image Trusted Loader ITL, is limited (the operating system 30*a* can only read/write one entire page from/to the memory 12 of the update agent), the described method enables better manage of the memory 12 of the update agent 10.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for changing and restoring personalization data of an installed software during a Full Reflash in a secure element (SE) the method comprising:
providing an update agent in the SE;
storing personalization data in the installed software;
performing a Full Reflash comprising:
securing the personalization data from the installed soft-ware to a memory of the update agent, and
loading a software image into the secure element, wherein the software image represents an updated version of the installed software; and
personalizing the software image by the personalization data secured in the memory of the update agent,
wherein the personalization data differs from initial per-sonalization data provided during factory production of the SE and comprises diversified data integrated within the installed software in the secure element but not integrated within a personalized software image, including Advanced Encryption Standard (AES) keys, EID numbers, and/or certificates.

2. The method according to claim 1, wherein the person-alization data is stored in the installed software and/or is secured by the update agent in a phase after the production phase of the secure element.

3. The method according to claim 1, wherein the person-alization data is stored together with the installed software in a memory area of the SE, and wherein the personalization data is secured by reusing and/or copying the personaliza-tion data from the memory area of the secure element to a memory of the update agent.

4. The method according to claim 1, wherein the installed software is deleted together with the personalization data by deleting the memory area of the SE prior to loading the software image or because of loading the software image into the memory area.

5. A secure element (SE), comprising an installed soft-ware, and an update agent comprising a memory, the installed software being configured for storing personaliza-tion data required for operating the installed software, and the update agent being configured for performing a Full Reflash comprising
securing personalization data from the installed software to the memory of the update agent, and
loading a software image into the SE, wherein the soft-ware image represents an updated version of the installed software; and
for personalizing the software image by the secured personalization data,
wherein the personalization data differs from initial per-sonalization data provided during factory production of the SE and comprises diversified data integrated within the installed software in the secure element but not integrated within a personalized software image, including Advanced Encryption Standard (AES) keys, EID numbers, and/or certificates.

6. The secure element according to claim 5, wherein the personalization data is stored together with the installed software in a memory area of the SE, and wherein the personalization data is secured by reusing and/or copying the personalization data from the memory area of the SE to a memory of the update agent.

7. An update agent for use in a secure element (SE), the update agent comprising a memory and being configured for performing a Full Reflash comprising
securing personalization data from the installed software to the memory of the update agent, and
loading a software image into the SE, wherein the soft-ware image represents an updated version of the installed software; and
for personalizing the software image by the secured personalization data,
wherein the personalization data differs from initial per-sonalization data provided during factory production of the SE and comprises diversified data integrated within the installed software in the secure element but not integrated within a personalized software image, including Advanced Encryption Standard (AES) keys, EID numbers, and/or certificates.

8. The update agent according to claim 7, wherein the personalization data comprises diversified data of the installed software.

9. The update agent according to claim 7, wherein the update agent is configured for performing a Full Reflash and for personalizing the software image by the secured person-alization data in a phase after the production phase.

10. A computer-program product for use in conjunction with a secure element (SE) in an electronic device, the computer-program product comprising a non-transitory computer-readable storage medium and a computer-program mechanism embedded therein, the computer-program mechanism including instructions for performing a Full Reflash comprising instructions for securing personalization data from the installed software to the memory of the update agent, and instructions for loading a software image into the SE, wherein the software image represents an updated version of the installed software; and instructions for personalizing the software image by the secured personalization data, wherein the personalization data differs from initial personalization data provided during factory production of the SE and comprises diversified data integrated within the installed software in the secure element but not integrated within a personalized software image, including Advanced Encryption Standard (AES) keys, EID numbers, and/or certificates.

* * * * *